US005888322A

United States Patent [19]
Holland

[11] Patent Number: 5,888,322
[45] Date of Patent: Mar. 30, 1999

[54] POLYMERIC OXYALKYLATE VISCOSITY MODIFIERS FOR USE IN GYPSUM WALLBOARD PRODUCTION

[75] Inventor: Christopher P. Holland, St. Charles, Ill.

[73] Assignee: Nalco Chemical Company, Naperville, Ill.

[21] Appl. No.: 892,382

[22] Filed: Jul. 14, 1997

[51] Int. Cl.$^6$ .............................. B32B 13/00; C04B 9/04
[52] U.S. Cl. .............................. 156/39; 106/781; 106/785
[58] Field of Search ................ 156/39; 106/781, 106/778, 785; 428/537.7

[56] References Cited

U.S. PATENT DOCUMENTS 3,307,987  3/1967  Bieri .
3,389,042  6/1968  Bieri et al. .
3,592,670  7/1971  Kossuth et al. .
4,222,984  9/1980  Ladwig .
4,818,506  4/1989  Lin et al. .
5,360,841  11/1994  Knop et al. ................................. 524/4

*Primary Examiner*—Peter Chin
*Assistant Examiner*—Dionne A. Walls
*Attorney, Agent, or Firm*—Thomas M. Breininger

[57] ABSTRACT

Methods for making gypsum wallboard and for enhancing the compressive strength of wallboard by the addition of polymeric oxyalkylate viscosity modifiers are described. Preferred compounds are a copolymer comprising blocks of ethylene oxide and propylene oxide ether-linked to (1,2 ethandiyl dintrilo) tetrakis (propanol), an ethylene oxide/propylene oxide block copolymer and a polyethylene glycol polymer cross-linked with bisphenol A diglycidyl ether and combinations thereof.

14 Claims, No Drawings

POLYMERIC OXYALKYLATE VISCOSITY MODIFIERS FOR USE IN GYPSUM WALLBOARD PRODUCTION

FIELD OF THE INVENTION

Methods for making gypsum wallboard and for enhancing the compressive strength of wallboard by the addition of polymeric oxyalkylate viscosity modifiers are described. Preferred compounds are a copolymer comprising blocks of ethylene oxide and propylene oxide ether-linked to (1,2 ethandiyl dintrilo) tetrakis (propanol), an ethylene oxide/ propylene oxide block copolymer and a polyethylene glycol polymer cross-linked with bisphenol A diglycidyl ether and combinations thereof.

BACKGROUND OF THE INVENTION

Gypsum wallboard is manufactured in what might be thought of as two steps or operations. Wallboard production is generally described in U.S. Pat. Nos. 3,592,670 and 3,389,042. First, there is manufactured a paper cover sheet, generally a multi-ply sheet manufactured on a cylinder machine in which a cylindrical screen rotates in a vat containing an aqueous slurry of paper furnish. Conventional sizing compounds such as rosin and alum are added to the selected vat to properly size some or all plies. Various numbers of plies after being formed on the screen, are removed therefrom and are superimposed to form an essentially unitary piece of paper, typically of about 0.020 inches thick.

In the gypsum board plant, as a second step, an aqueous slurry of settable gypsum plaster, having more than sufficient water for hydration and setting of the gypsum, is spread on the advancing paper cover sheet and a second paper cover sheet is continuously applied on top of the gypsum as the onset, wet board is moved through the forming apparatus. The partially hardened, endless board is then cut into desired lengths and passed into a high temperature drying kiln.

The paper ply of the multi-ply cover sheet directly adjacent the plaster core is known as the bond ply or core-side ply. This ply, and the filler plies intermediate to the bond ply and the outermost ply or top liner ply, are commonly formed from a mixture of waste paper pulps. The bond ply, top liner ply and filler plies may be made of substantially the same or different paper furnish. For example, the bond ply and filler plies formed from a mixture of waste paper pulps can be employed in the manufacture of the paper cover sheet. Where an attractive outermost ply is required, such as creamface, it may be made from groundwood and sulfite or other type of suitable pulp.

Generally, the paper cover sheets used in gypsum wallboard range in thickness from about 0.010 to 0.030 inch, and preferably 0.016 to 0.023 inch, and have tensile strengths in the machine direction of about 50–115 lbs./in. and in the across-machine direction within the range of about 15–40 lbs/in.

It is necessary to have a strong bond between the gypsum core and the paper cover sheet in the finished board to prevent separation or delamination of the paper from the core. Separation can occur either in the form of "film peeling" in which a thin layer of the core is removed along with the paper and adheres thereto, or a "clean peel" in which the paper is cleanly separated from the gypsum core.

Generally, it has been considered necessary to provide for absorption of water from the gypsum slurry into at least the bond ply of the multi-ply paper covering sheet. The water absorption mechanism carries some dissolved gypsum into the paper where the gypsum crystallizes and provides a resultant mechanical linking of the paper to the gypsum core. This absorption of water by the paper, however, decreases the ratio of water to unset gypsum in a very thin layer of the gypsum core immediately adjacent the paper cover sheet, particularly during initial setting of the gypsum core when the ratio of water to gypsum is critical to obtain the desired quality of set gypsum throughout the core. In the thin layer of unset gypsum having a relatively lower water ratio, a different crystal growth occurs from that throughout the balance of the core, creating what is termed stratification. Stratification becomes increasingly apparent with efforts to accelerate the setting of the gypsum, or to decrease the drying time in the kiln. Also, gypsum manufactured from ores of relatively low purity may aggravate the problem.

As the degree of stratification increases, the tendency of the thin layer of gypsum to become recalcined during drying in the kiln increases. Accordingly, stratification creates a limiting factor in the drying speed and thus in the overall production rate for a manufacturing facility. If the two stratified layers of gypsum adjacent the two paper cover sheets become recalcined during drying, the integrity and strength of the core at these layers is reduced permitting the cover sheets to be susceptible to so-called "film peeling" which is manifested by separation of the paper from the core with a thin layer of the core adhering to the paper.

The tendency toward recalcination of the stratified layers of gypsum can be lessened, for example, by adding a small percentage of starch, or other suitable water retention agent, to the gypsum mix used to form the core. The starch migrates toward, and partially into, the paper during the drying and, by its hydrophilic nature, tends to retain water wherever the starch becomes concentrated, including generally the interface zone where the stratification occurs. The greater portion of the starch, however, migrates into the paper because of the absorptiveness of the paper. Where a loss of starch from the gypsum core to the paper occurs, another type of paper core separation, known as "clean peel," occurs wherein the paper cleanly separates from the core with substantially no core particles clinging to it. For sufficient protection against recalcination in the zone of stratification and to compensate for starch loss, a larger amount of starch is generally necessary than would be necessary if the starch could be concentrated in the outermost zone of the gypsum core.

The additional amounts of starch required in a core formulation, as above stated, and the absorptivity of the paper cover sheet necessitate greater portions of water in forming the core, thus increasing the amount of drying ultimately required and deleteriously affecting the rate at which the board can be manufactured with given drying facilities.

In addition to the problems of separation or delamination at the interface between the gypsum core and the cover sheets, the multi-ply paper cover sheets are also subject to intra-ply separation and/or delamination of each of the plies from the other during the board-drying operation. Various techniques have been utilized to obviate delamination of the plies, such as the inclusion of wet strength resins in the paper cover sheet. Aminoplastic resins such as melamine-formaldehyde or urea-formaldehyde resins are commonly employed, and the resins are preferably added during the paper-making stage of the gypsum board manufacturing operation. While the use of aminoplastic resins for imparting wet strength to the paper plies minimizes delamination of the paper plies, this is an added expense in the cost of manufacture.

In further investigations of the problems of stratification, recalcination and delamination, the face of the paper cover sheet in contact with the gypsum core was treated with a suitable material which would make it highly repellent to water, or more specifically non-absorptive, without substantially decreasing the normal porosity of the paper. Suitable materials which effect this objective and treating techniques are described in U.S. Pat. No. 3,307,987 by David Bieri.

At various points in the gypsum wallboard manufacturing process, materials are added for different purposes to gypsum stucco during the mixing of the feed slurry.

Starch, dispersant, accelerators, foam and water are some of the materials fed into the mixer with the stucco in order to make up the slurry for the wallboard formation. Other special materials are added if fire resistance and other characteristics are required of the wallboard.

Starch is used to protect the gypsum crystals that form the bond with the paper. These crystals, located at the edges of the wallboard, are subject to dehydration during the period of high temperatures in the drying kilns. If dehydration occurs, the paper will peel off the board core. The starch holds water during kiln drying and protects these bonding crystals from severe dehydration.

An accelerator is used as the catalyst to control the time that is desired to "set" the board on the production line. The minimum quantity of accelerator is employed which gives the hardening rate needed for the speed and equipment of a production line. An excess of accelerator can cause a weakened board core.

Water reducing agents are used to minimize the excess water required for processability of the stucco slurry. They also reduce surface tension and allow the slurry to flow with less frictional resistance. Foam is added in order to give about 25% by volume of soap bubbles to the slurry. This provides the board with the lighter weight necessary for easy handling, allows the board to be nailed without cracking or breaking, and gives some flexibility to the wallboard. Pulped paper is added to furnish a web or fibers to help hold the crystalline core together and also add flexibility to the finished product. Fiberglass has the same purpose in the fire rated wallboard products. Water is needed to make a slurry out of all the ingredients so that they will form a homogeneous mixture. The water also furnishes one ingredient needed for the reaction of stucco with water to make the gypsum wallboard. Therefore, water carries the ingredients and furnishes the medium in which the wallboard forming takes place. The ratio of water to stucco is usually 9 to 10. In the production of wall board on a commercial scale board forming machine and in particular the formation of the core portion, a part of the total water volume to be used in the slurry which will form the core is added to an accelerator tube along with an excess of fine gypsum stucco particles to form the aqueous suspension wherein the stucco is hydrated and forms fine calcium sulfate dihydrate crystals. In some cases where a lighter weight wallboard is desired another part of the total water content of the slurry is added to a foam generator with an aqueous solution of detergent or soap and agitated therein to form a foam. The remainder of the slurry water content is charged into a beater along with starch, paper stock, a retarder and other additives. The mixture is agitated by the beater blades for approximately one hour. All of the components of the core formulation are then brought together in a pin mixer where they are agitated briefly to form a uniform slurry which is discharged at a controlled rate onto a sheet of wallboard face paper continuously advancing on a moving conveyor whereon the wallboard is formed. A second sheet of face paper is then disposed on top of the continuously advancing layer of slurry. The core is allowed to harden sufficiently so that the wallboard may be handled without being damaged and it is then placed on a conveyor which carries it through drying ovens where substantially all of the free water is removed. The slurry is discharged from the mixture onto a continuously moving paper covered line. This line normally runs at a speed of about 125 to 150 feet per minute. The paper is formed into an envelope which holds the stucco slurry until it has a chance to react and bond itself intimately to the paper. It then hardens, or sets, and then it can be cut and mechanically positioned for drying. Usually, 75% of the water added during forming -must be evaporated out of the board during drying (about 1 pound per square foot of wallboard). This drying time is usually 45 to 60 minutes and requires 2 to 2.5 million BTU per one thousand square feet of regular ½ inch thick wallboard. To increase energy efficiency in manufacturing processes, it is advantageous to decrease on the water required to manufacture gypsum wallboard, and thus, cut down on the energy required to dry the finished product. Upon completion of the drying process, the board is bundled, taped and stacked for shipment.

In order to make the process more efficient, it his become necessary to modify some of the standard additives. For example, reformulation of the dispersant is required in order to make it stronger acting so that the amount of water required may be reduced, while overcoming the properties causing soft, crumbly board and lengthened setting and drying time.

A dispersant formulation of a calcium lignin sulfonate and an ammonium linear alcohol ether sulfate for wallboard production is described in U.S. Pat. No. 4,222,984. Naphthalene condensate polymers may also be useful. Most dispersants presently used by the industry are by-products from the pulp digesting process, wherein the lignin is dissolved from the wood chips allowing wood fibers to separate. The lignin is dissolved by sulfonic acid and the lignin sulfonate by-product is separated, recovered and sold to many industries as a dispersant. These lignin sulfonate by-products contain other chemicals from the pulping process, especially fairly large amounts of wood sugars and smaller amounts of soluble chemicals. In most tests made, the lignin sulfonates, especially the sodium salts, were harmful to the quality of the finished gypsum test specimens. They are especially undesirable used in large amounts because of the possibility of humidified splits occurring after the wallboard is shipped.

One object of the present invention was to develop an economical dispersant formulation which would not have the deleterious effect on wallboard quality that the lignins showed at higher use levels. Another object of this invention was to develop a dispersant which would increase the diffusion rate of water vapor from the wallboard during the oven drying process, and thereby increase productivity and fuel efficiency.

SUMMARY OF THE INVENTION

Methods for making gypsum wallboard and for enhancing the compressive strength of wallboard by the addition of polymeric oxyalkylate viscosity modifiers are described. Preferred compounds are a copolymer comprising blocks of ethylene oxide and propylene oxide ether-linked to (1,2 ethandiyl dintrilo) tetrakis (propanol), an ethylene oxide/ propylene oxide block copolymer and a polyethylene glycol polymer cross-linked with bisphenol A diglycidyl ether and combinations thereof.

DESCRIPTION OF THE INVENTION

The invention is a method for making gypsum wallboard, comprising the steps of:

a) preparing an aqueous dispersion of gypsum, said dispersion containing a slip viscosity reducing amount of a polymer selected from the group consisting of a copolymer comprising blocks of ethylene oxide and propylene oxide ether-linked to (1,2 ethandiyl dintrilo) tetrakis (propanol), an ethylene oxide/propylene oxide block copolymer and a polyethylene glycol polymer cross-linked with bisphenol A diglycidyl ether and combinations thereof;

b) sandwiching the slurry in a paper envelope to form wallboard; and c) heating the wallboard to drive off enough water to give the wallboard its final desired hardness and strength.

For the practice of this method, from 0.5 to 10.0 pounds of polymer may be added to one thousand square feet of one-half inch wallboard. The polymer may be a polyethylene glycol polymer cross-linked with bisphenol A diglycidyl ether and may have a molecular weight of from about 9,000 daltons to about 1,000,000 daltons. Furthermore, that polymer may be up to about 85 percent cross-linked. Preferably, that polymer is up to about 40 percent cross-linked.

Alternatively, for the practice of this invention, the polymer may be blocks of ethylene oxide and propylene oxide ether-linked to (1,2 ethandiyl dintrilo) tetrakis (propanol) and the molecular weight of the polymer may be from about 5,000 to about 20,000. Such a polymer may comprise from about 20 to about 30 weight percent propylene oxide and from about 80 to about 90 weight percent ethylene oxide.

The invention is also a method for enhancing the compressive strength of a gypsum wallboard during the manufacture of said gypsum wallboard comprising the steps of adding an effective enhancing amount of a copolymer comprising blocks of ethylene oxide and propylene oxide ether-linked to (1,2 ethandiyl dintrilo) tetrakis (propanol), an ethylene oxide/propylene oxide block copolymer and a polyethylene glycol polymer cross-linked with bisphenol A diglycidyl ether and combinations thereof to the aqueous gypsum wallboard slurry prior to dewatering said slurry.

For the practice of this method, from 0.5 to 10 pounds of polymer may be added per 1000 square feet of one-half inch wallboard.

The polymer utilized may be a polyethylene glycol polymer cross-linked with bisphenol A diglycidyl ether, which has a molecular weight of from about 9,000 daltons to about 1,000,000 daltons. Such a polymer may be up to about 85 percent cross-linked. Preferably, that polymer may be up to about 40 percent cross-linked.

For the practice of this method, the polymer may also be composed of blocks of ethylene oxide and propylene oxide ether-linked to (1,2 ethandiyl dintrilo) tetrakis (propanol) and the molecular weight of the polymer may be from about 5,000 to about 20,000. Such a polymer may comprise from about 20 to about 30 weight percent propylene oxide and from about 80 to about 90 weight percent ethylene oxide.

Various copolymers have been described as useful for gypsum scale inhibition in U.S. Pat. No. 4,818,506. Examples of the block copolymer useful in the present invention are the simple A-B-A copoly(ethylene oxide-propylene oxide) condensates and copolylene oxide-propylene oxide) ether-linked to (1.2-ethandiyldinitrilo) tetrakis[propanol] (4:1) (CS 11111-34-5). These copolymers are produced by a number of chemical companies including BASF, GAF, Mazer Chemicals and Nalco Chemical Company among others. EO/PO block copolymers of the Tetronics line available from BASF in Parsipanny, N.J. will be useful for this application.

A useful PEG polymer comprises introducing Bisphenol A diglycidyl ether in an amount sufficient in the synthesis of a PEG polymer to crosslink up to approximately 85% of the PEG polymer. Because of side reactions that compete for reactants, up to about 40% of the PEG polymer is crosslinked in the final product. The excess of PEG in the reaction allows less of the Bisphenol A diglycidyl ether to participate in undesired side reactions. This decreases insoluble gel and solution viscosity in the final product.

The dispersant, preferably as an aqueous emulsion or solution, is applied to form a slurry consisting of stucco, water and other additives. Other techniques for applying the dispersant will be apparent to those skilled in the art to which this invention pertains. A suitable curing catalyst may be applied to the paper by the same or different technique from that used in applying the dispersant; and the catalyst may be applied shortly before, simultaneously with, or after the addition of the dispersant to the paper. For example, the dispersant may be applied to the paper by roller application at the dryer section of the papermaking process, and thereafter the catalyst may be applied by spraying with a suitable nozzle. As a further illustration, the catalyst may be added continuously to the paper finish for one or more of the plies prior to forming on the paper-making machine, and thereafter applying the dispersant to the paper stock prior to the formation or after formation of the paper web.

The amount of dispersant incorporated in the paper is and should be sufficient to effect the objectives of this invention. This amount will depend primarily upon operating conditions such as machine speeds, composition of the paper, nip pressure or doctor blade adjustment where flooding or roller applications are used, spray conditions where employed, as well as temperature, viscosity and composition of the dispersant. Generally, about 0.1 to 4 pounds of dispersant per ton of paper treated on one side will give satisfactory results, and more preferably about 0.2 to 2 pounds, for a conventional wallboard multi-ply cover sheet typically having a thickness of about 0.020 inch. Where an amount less than 0.1 pound is used, the desired qualities are to some extent reduced. On the other hand, generally there is no additional benefit in employing more than 4 pounds of dispersant.

The following examples are presented to describe preferred embodiments and utilities of the invention and are not meant to limit the invention unless otherwise stated in the claims appended hereto.

EXAMPLE 1

To evaluate the efficiency of treatment agents in the wallboard manufacturing process, the following procedure was utilized. 50 grams of stucco from a midwestern wallboard manufacturing facility and 38 grams of tap water were added to an 8 oz. jar. The mixture was allowed to soak undisturbed for 1 minute. During this period, a gentle tapping motion was used to help the stucco settle. Next the mixture was stirred for 10 seconds. Subsequently, the mixture was immediately poured onto a glass plate from a height of 3" (approximately the shoulder of the spatula blade) to form a patty. In the absence of any other additives, the control patty size should be 3"+/−1/16".

The procedure described above was repeated, with a separate evaluation of each treatment agent. In each case, 0.1 grams of the treatment to be tested was added to the rumbler concurrently to the addition of the stucco. After a specified number of minutes to allow for setting, the patty size was measured in inches. A patty size large than that obtained for the control (in the absence of water reducing agent polymeric treatment) indicates a lower slip viscosity. Such a lower slip viscosity enhances the compressive strength of the wallboard, increasing the efficiency of the wallboard production process. The results of Table I illustrate that either novel treatment A or novel treatment B will increase the efficiency of the wallboard production process over the conventional treatments C and D, as evidenced by the larger patties formed.

TABLE I

| Treatment | Tap H$_2$O (g) | Patty Size (inches) | Set Time (minutes) |
|---|---|---|---|
| A[1] | 36 | 4.50 | 2 |
| | 34 | 4.25 | 1.5–2 |
| | 32 | 3.75 | 1 |
| | 30 | 3.25 | 1 |
| | 28 | 2.65 | 1 |
| B[2] | 36 | 4.50 | 1.5–2 |
| C[3] | 36 | 4:00 | 2 |
| D[4] | 36 | 3.75 | 2 |

1 = A copolymer comprising blocks of ethylene oxide and propylene oxide ether-linked to (1,2 ethandiyl dintrilo) tetrakis (propanol) available from Nalco Chemical Company, Naperville, Illinois
2 = A polyethylene glycol polymer cross-linked with bisphenol A diglycidyl ether available from Nalco Chemical Company, Naperville, Illinois
3 = Marasperse CBOS-4, a highly purified calcium and sodium lignin sulfonate water-reducing agent; available from Borregaard-Lignotech Company of Bridgewater, NY
4 = Daxad 16, a napthalene sulfonate water reducing agent available from Hampshire Chemical Corporation, of Lexington, Massachusetts Changes can be made in the composition, operation and arrangement of the method of the present invention described herein without departing from the concept and scope of the invention as defined in the following claims:

I claim:

1. A method for making gypsum wallboard, comprising the steps of:
   a) preparing an aqueous dispersion of gypsum, said dispersion containing a slip viscosity reducing amount of a polymer selected from the group consisting of a copolymer comprising blocks of ethylene oxide and propylene oxide ether-linked to (1,2 ethandiyl dintrilo) tetrakis (propanol), an ethylene oxide/propylene oxide block copolymer and a polyethylene glycol polymer cross-linked with bisphenol A diglycidyl ether and combinations thereof;
   b) sandwiching the slurry in a paper envelope to form wallboard; and
   c) heating the wallboard to drive off enough water to give the wallboard its final desired hardness and strength.

2. The method of claim 1 wherein from 0.5 to 10.0 pounds of said polymer is added to one thousand square feet of one-half inch wallboard.

3. The method of claim 1 wherein the polymer is a polyethylene glycol polymer cross-linked with bisphenol A diglycidyl ether and has a molecular weight of from about 9,000 to about 1,000,000.

4. The method of claim 3 wherein said polymer is up to about 85 percent cross-linked.

5. The method of claim 3 wherein said polymer is up to about 40 percent cross-linked.

6. The method of claim 1 wherein the polymer is blocks of ethylene oxide and propylene oxide ether-linked to (1,2 ethandiyl dintrilo) tetrakis (propanol) and the molecular weight of the polymer is from about 5,000 to about 20,000.

7. The method of claim 6 wherein the polymer comprises from about 20 to about 30 weight percent propylene oxide and from about 80 to about 90 weight percent ethylene oxide.

8. A method for enhancing the compressive strength of a gypsum wallboard during the manufacture of said gypsum wallboard comprising the steps of adding an effective enhancing amount of a copolymer comprising blocks of ethylene oxide and propylene oxide ether-linked to (1,2 ethandiyl dintrilo) tetrakis (propanol), an ethylene oxide/propylene oxide block copolymer and a polyethylene glycol polymer cross-linked with bisphenol A diglycidyl ether and combinations thereof to the aqueous gypsum wallboard slurry prior to dewatering said slurry.

9. The method of claim 8 wherein from 0.5 to 10 pounds of said polymer is added per 1000 square feet of one-half inch wallboard.

10. The method of claim 8 wherein the polymer is a polyethylene glycol polymer cross-linked with bisphenol A diglycidyl ether and has a molecular weight of from about 9,000 to about 1,000,000.

11. The method of claim 10 wherein said polymer is up to about 85 percent cross-linked.

12. The method of claim 10 wherein said polymer is up to about 40 percent cross-linked.

13. The method of claim 8 wherein the polymer is blocks of ethylene oxide and propylene oxide ether-linked to (1,2 ethandiyl dintrilo) tetrakis (propanol) and the molecular weight of the polymer is from about 5,000 to about 20,000.

14. The method of claim 13 wherein the polymer comprises from about 20 to about 30 weight percent propylene oxide and from about 80 to about 90 weight percent ethylene oxide.

* * * * *

UNITED STATES PATENT AND TRADEMARK OFFICE
CERTIFICATE OF CORRECTION

PATENT NO.   : 5,888,322
DATED        : March 30, 1999
INVENTOR(S)  : Christopher P. Howland It is certified that error appears in the above-identified patent and that said Letters Patent is hereby corrected as shown below:

On the title page. item [75]:

Inventor: Christopher P. Holland, St. Charles, Ill.

Should read--

Inventor: Christopher P. Howland, St. Charles, Ill.

Signed and Sealed this

Seventh Day of September, 1999

Q. TODD DICKINSON

*Attest:*

*Attesting Officer*   Acting Commissioner of Patents and Trademarks